(12) United States Patent
Tyagi et al.

(10) Patent No.: US 10,775,058 B2
(45) Date of Patent: Sep. 15, 2020

(54) PUMPLESS SOLAR ENERGEY BASED AIR HEATER AND METHOD

(71) Applicants: Pawan Tyagi, Derwood, MD (US); Devdas Shetty, North Bethesda, MD (US)

(72) Inventors: Pawan Tyagi, Derwood, MD (US); Devdas Shetty, North Bethesda, MD (US)

( * ) Notice: Subject to any disclaimer, the term of this patent is extended or adjusted under 35 U.S.C. 154(b) by 0 days.

(21) Appl. No.: 16/059,912

(22) Filed: Aug. 9, 2018

(65) Prior Publication Data

US 2020/0049356 A1    Feb. 13, 2020

(51) Int. Cl.
*F24F 5/00*        (2006.01)
*F24S 10/30*      (2018.01)
*F24S 20/66*      (2018.01)

(52) U.S. Cl.
CPC ............ *F24F 5/0046* (2013.01); *F24S 10/30* (2018.05); *F24S 20/66* (2018.05); *F24F 2005/0064* (2013.01)

(58) Field of Classification Search
CPC ...... F16K 15/144; F16K 15/145; F16K 15/47; F28F 13/08; F24S 20/61
USPC ............................................ 165/90; 126/638
See application file for complete search history.

(56) References Cited

U.S. PATENT DOCUMENTS

| | | | | |
|---|---|---|---|---|
| 4,284,068 A | * | 8/1981 | Gunderson | F24S 10/45 126/655 |
| 4,494,528 A | * | 1/1985 | Horton | A01K 47/06 126/627 |
| 4,598,696 A | * | 7/1986 | Clegg | F24S 10/742 126/665 |
| 5,413,091 A | * | 5/1995 | Bourke | F24S 10/70 126/598 |
| 2010/0319681 A1 | * | 12/2010 | Li | F24S 10/45 126/640 |
| 2016/0377349 A1 | * | 12/2016 | Cool | F24H 9/0026 165/109.1 |

* cited by examiner

*Primary Examiner* — Steven B McAllister
*Assistant Examiner* — Rabeeul I Zuberi

(57) ABSTRACT

A pumpless solar energy-based air heater includes a body housing a chamber surrounded by a heat conducting medium; an intake pipe to draw cool air into the chamber; and one or more exit pipes to push warm air out from the chamber, the one or more exit pipes having one or more structures within the interior of the one or more exit pipes to create a low friction factor for the air flowing upwards in the exit pipe while creating a high friction factor for the air attempting to move downward, thereby ensuring air flow in an upward direction; a pressure difference is created between an entry point of the intake pipe and an end point of the one or more exit pipes, thereby eliminating the need for a pump or a fan.

3 Claims, 8 Drawing Sheets

Top-view of heat exchanger

Interior structure of the metal pipes

PUMPLESS SOLAR ENERGEY BASED AIR HEATER AND METHOD

BACKGROUND

1. Field of the Invention

The present invention relates generally to air heater systems, and more specifically to a heat exchanger for solar energy based air heater that is configured to pull cool air from a room/building, warm the air via solar energy, and push the warm air back into the room/building without the use of any mechanical pump or fan.

2. Description of Related Art

Existing solar thermal air heaters require mechanical pumps and/or fans to circulate air through a solar thermal collector and push the air into a room. Some existing solar thermal air heaters are configured to be mounted within a window area, thereby blocking light and being aesthetically unpleasing. The need for a pump/fan, as well as the unappealing aesthetical appearance of these conventional solar thermal air heaters are disadvantages and therefore, it is an object of the present invention to provide an aesthetically pleasing, pumpless solar energy based air heater.

Conventional solar thermal air heaters have additional disadvantages, including: (i) the need to make significant changes in the window or the point where these heaters will be employed; (ii) fan/pump requirements to circulate air between heater and interior air (hence, if electricity is not available then it may not be possible to heat the home effectively); (iii) repair and replacement of these solar air heating unit may be tricky and may be costly; (iv) it may be unaesthetic for certain homeowner.

Accordingly, although great strides have been made in the area of solar thermal heaters, many shortcomings remain.

The desirability of doing indoor air heating from the sun is highly popular and appears as a very straightforward and sensible concept. However, most homes, businesses and buildings still do not take advantage of the free heating energy available from the sun. This is because of the high cost associated with the present solar systems, which is driven by their complexity in construction, installation, and operation. The operation of solar thermal air heaters also dependent on proper functioning of fans and availability of source of electricity. These days many solar air heaters embed a solar panel next to solar thermal collector to supply electricity for circulating air between indoor and solar thermal collector. However, in a cloudy day or a place where shade appear during the day time solar cell may not generate enough power to mobilize the indoor air. It is noteworthy that a solar thermal collector may absorb almost full sun spectrum, but solar cell can only utilize partial sun spectrum to circulate fan for air circulation. Solar cells are made up of silicon like semiconductor that require more than 1 eV of high intensity sun radiation energy to function. Therefore, utilizing solar cells for running fan to exchange air between home and solar air heater may reduce the usefulness of a solar air heater and increase the size of the overall solar thermal heater size and manufacturing cost significantly. Additionally, if a fan or any component of a solar cells fail then a solar cell dependent solar thermal air heater may stop working right away. Repairing of solar cell dependent solar thermal air heater may be costly and time consuming. Due to the such potential issues many potential customers of solar air heaters may not choose solar air heating.

This invention focuses on utilizing sun heat to circulate indoor air between solar collector and indoor air by utilizing a new heat exchanger designed for different types of solar thermal collectors. This invention discloses the design of heat exchanger that is to be integrated with popular thermal collectors, solar thermal vacuum tubes, and flat plate solar collector. The heater of the present invention creates a net pressure difference and hence provide a pumpless simple solar thermal air heater that is compact and can be mounted on the exterior region of a home, near a sun facing window with insignificant changes in the window or home. Therefore, this invention provides for a more aesthetically pleasing apparatus.

In summary, this invention provides a solution to make solar thermal air heating cost effective, maintenance free (as no fan or solar cell is used), robust operation, retrofittable without drilling holes in the home structures.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
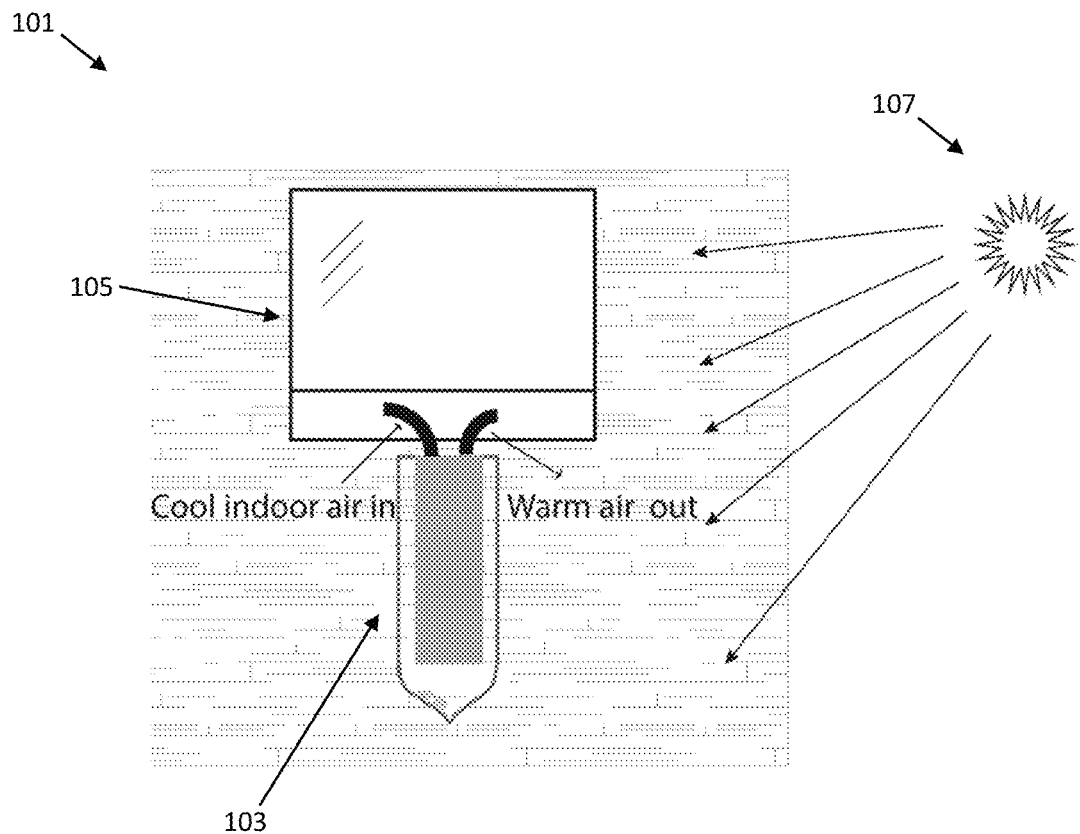
FIG. 1 is a simplified schematic of a pumpless solar energy based air heater in accordance with the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional solar energy based air heaters. Specifically, the present invention provides for a pumpless and aesthetically pleasing solar energy based air heater. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 1-6 depict various views of components of a pumpless solar energy based air heater in accordance with a preferred embodiment of the present application.

In FIG. 1, a simplified schematic depicts a heating system 101 wherein a pumpless solar energy based air heater 103 is secured to a window 105. It should be appreciated that as shown, cool air is pulled from the building, warmed via solar energy 107, and then pushed back into the room without requiring any mechanical pump or fan.

Figure 2:
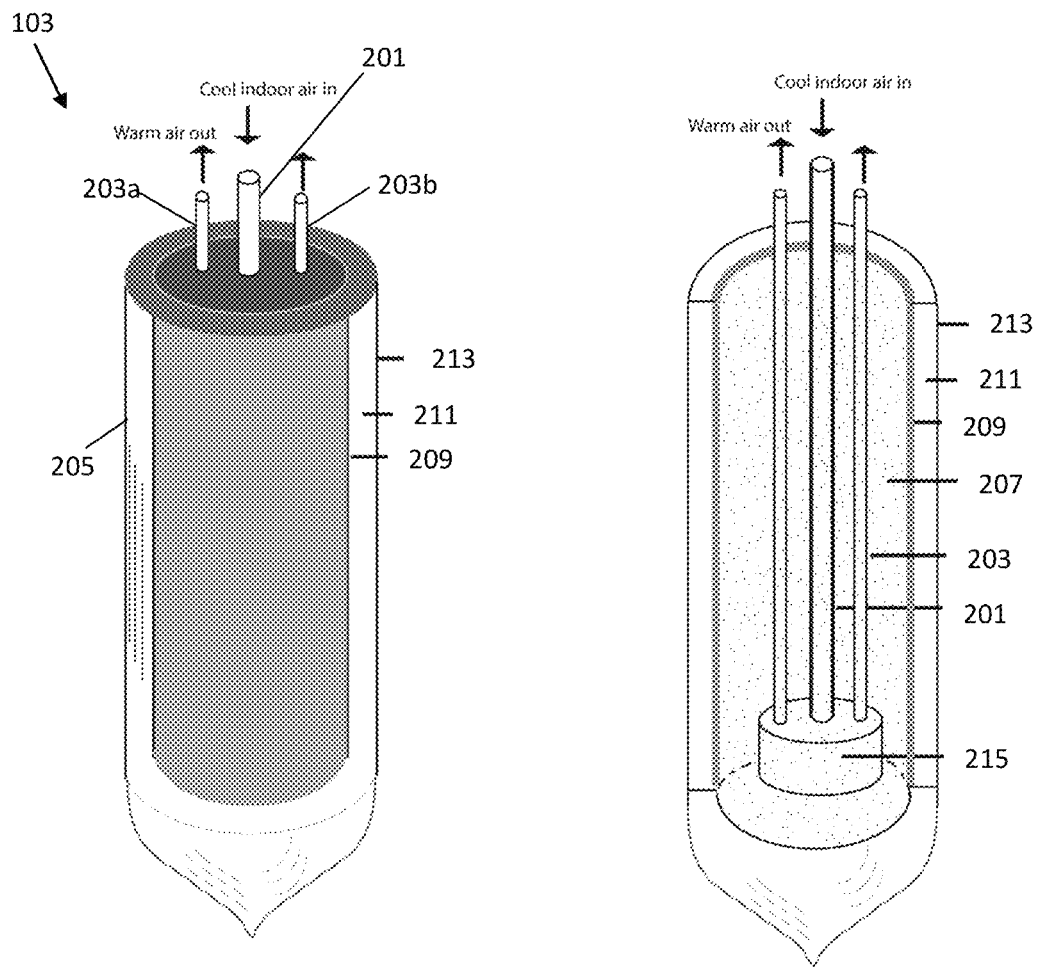
FIG. 2 is a simplified side and interior view of the heater of FIG. 1.

In FIG. 2, a heater 103 is shown, having one or more intake pipes 201 and one or more exit pipes 203. It should be appreciated that any number of pipes can be used as exit pipes based on the space available within the solar thermal collector body 205. As further shown in FIG. 2, the pipes 201, 203 are embedded within a heat conducting medium 207, which is further enclosed within a radiation absorbing layer 209, a vacuum layer 211, and an outer glass layer 213. Insulation around intake pipe 201 ensure that air inside the intake pipe do not get heated to the same temperature as air inside the metal exit pipes will get heated. As a result, air inside the intake pipe will be cooler than the air inside the exit pipes. Cool air is denser than the hot air and hence cool air inside the intake pipe will assist in creating a net pressure difference between intake and exit pipes. As a result selecting insulating material for intake pipes and metallic materials for the exit pipes will enhance the heat exchanger's capability to create higher pressure difference.

It should be appreciated that the various shapes, materials, and sizes can be incorporated into the features discussed herein. The whole heat exchanger will be surrounded by the medium to transport heat form the solar collector inner glass wall to the heat exchanger. Further, the exit pipes are typically made of metallic material, such as steel, aluminum, and copper. These pipes may also be 3D printed to create specific internal structures (as discussed herein) which are necessary to create a differential pressure between exit and intake points (thereby eliminating the need for a pump/fan).

Figure 3:
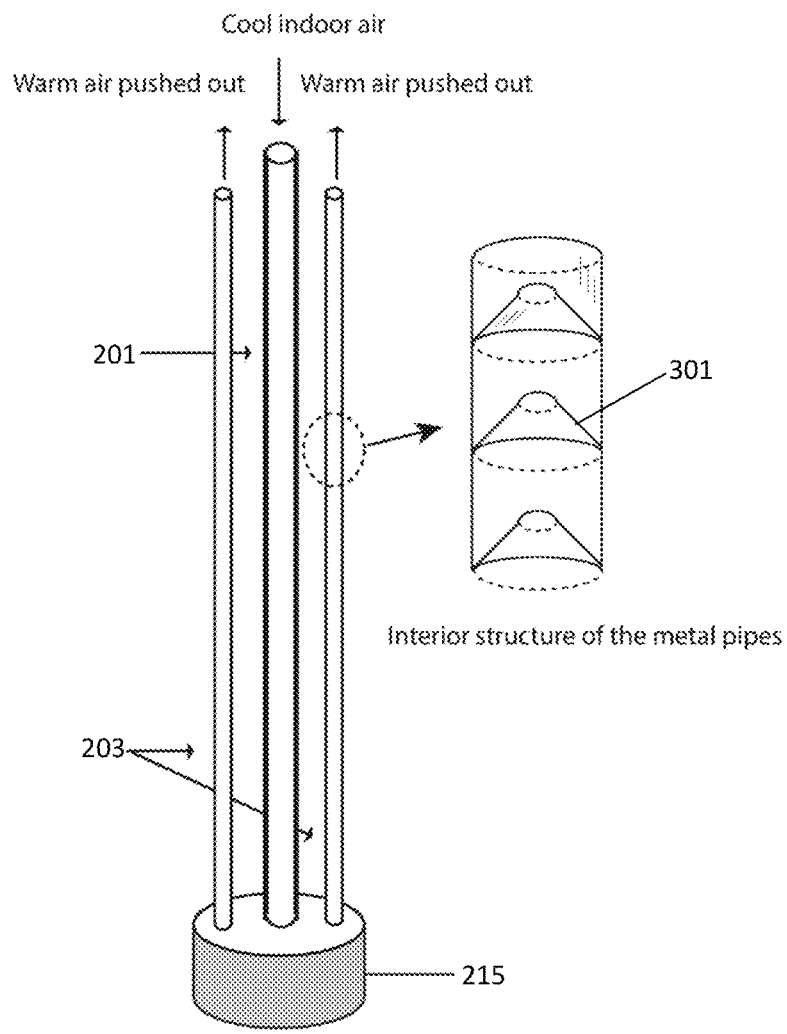
FIG. 3 is a simplified side view of the inlet and exit pipes of FIG. 2.
Figure 6:
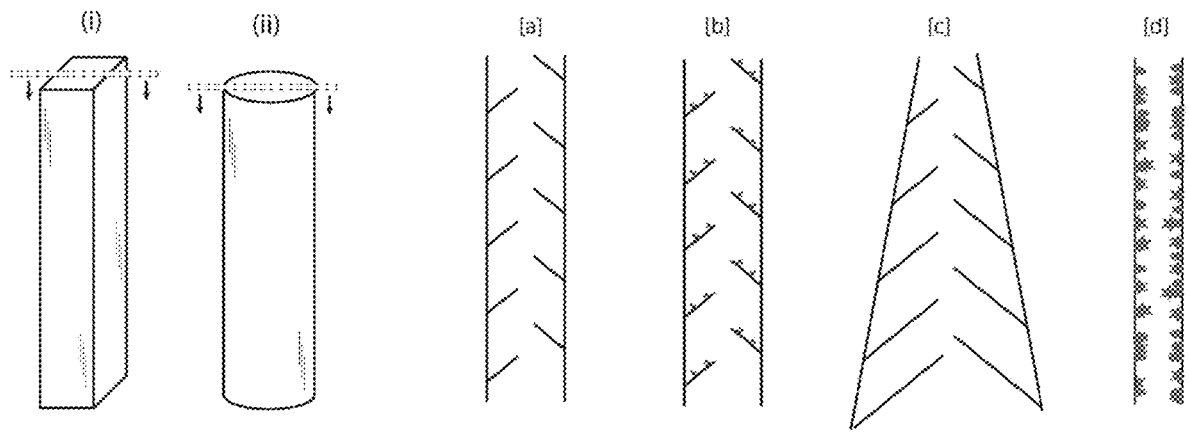
FIG. 6 depicts alternative embodiments contemplated for the inlet and exit pipes of FIG. 2.

In FIG. 3, the internal structure of the exit pipes is shown, wherein this structure allows for the creation of a net pressure difference between the entry point of the intake pipe 201 and the end points of the exit pipes 203. As shown, the interior of the exit pipes can include a plurality of structures 301 which create a low friction factor for the air flowing up the exit pipe and product a high friction factor for any air attempting to move downward. This feature ensures that preferential flow of air is always in the upward direction. As shown, in the preferred embodiment, the structures 301 are conical in shape, however, as shown in FIG. 6, the structures can vary, include protrusions, or other features. These internal features of the pipes are design to create high friction when air flows downward in the exit pipe, but a small amount of friction when air is flowing upward.

It should be appreciated that one of the unique features believed characteristic of the present application is this difference in friction, which allows for the heater to push air back into a building without the use of a pump or fan. The internal features of the exit pipes are also helpful in providing high surface area to heat the air in the exit pipes. Due to high heating air expands in the exit pipe and create pressure. This pressure will now move the air upward and downward in the pipe. However, as discussed above air flow is mainly to happen upward in the exit pipes because internal features in the exit pipe only favor upward flow. As heated air will move upward, it will create space or kind of vacuum to draw cool air from the intake pipe into the exit pipe. Cool air will get heated in the exit pipe and will move upward. This cycle will keep happening as long as sun radiation is heating the medium present around the heat exchanger pipes. Hence, the heat exchanger disclosed here will make cool air move through the air heater without requiring additional pump or external fan. The intake pipe, which can be nonmetallic, may also have similar internal features. However, the role of such internal features will be mainly to promote the downward flow of air and restrict the upward flow of air within the intake pipe.

Figure 4:
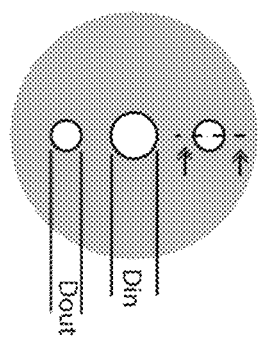
FIG. 4 is a top view of the inlet and exit pipes of FIG. 2.
Figure 4:
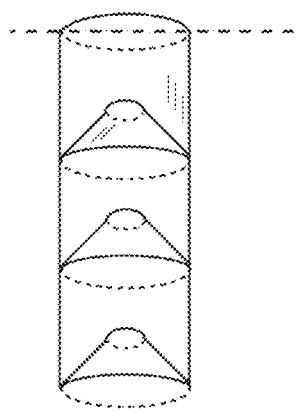

In FIG. 4, a top view of the heat exchanger and the interior structure of the pipes is further shown for clarity. In some embodiments, the intake pipe will have a larger diameter than the exit pipes.

Figure 5:
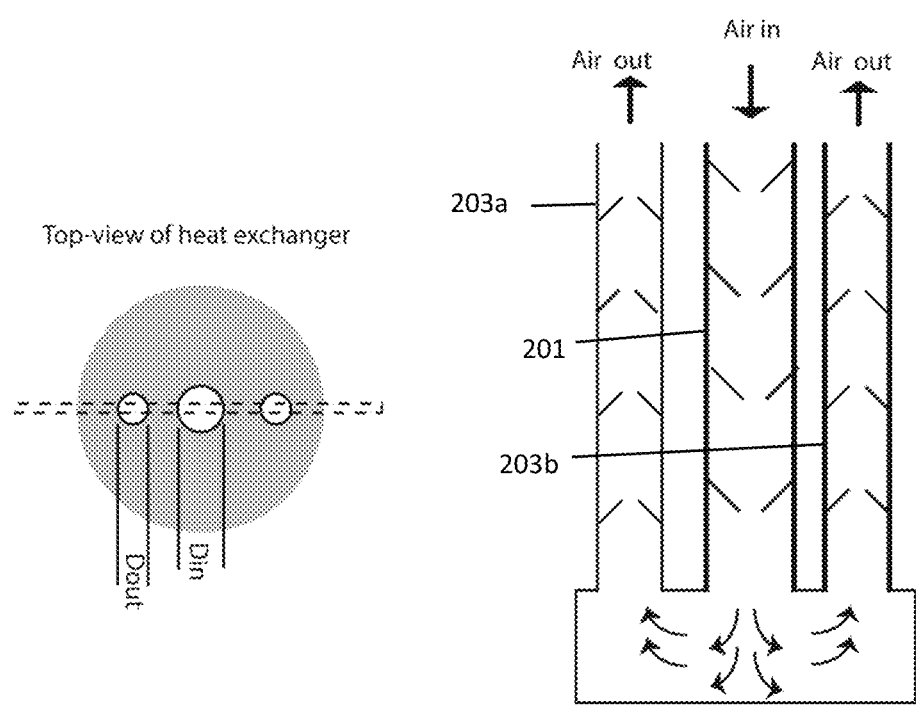
FIG. 5 is a top view and a side interior view of the inlet and exit pipes of FIG. 2.

In FIG. 5, a cross sectional view of an intake pipe, and two exit pipes are shown for clarity. As shown, the intake pipe can have structures that allow for air to flow freely into the chamber, while preventing air from coming back up the intake pipe. As the air is heated, it is then pushed easily through the exit pipes, wherein the internal structures prevent backward movement of the air.

In FIG. 6, alternative embodiments of the exit pipe are shown, wherein the exit pipe can vary in shape ((i) rectangular and (ii) circular). These pipes may have a variety of features to promote net pressure difference between the entry point of the intake pipe and the end points of the exit pipes. (a-d) shows the cross-sectional view of various internal designs that may create preferential air flow in one direction and also allow large surface area for effective heat transfer from pipe wall to flowing air. These features can be produced by the metal additive manufacturing. Three dimensional drawing or models of the disclosed heat exchangers can be directly produced in 3D printers or additive manufacturing machines. The laser sintering based metal 3D printing may also produce very high surface roughness on the interior surface of the disclosed heat exchanger. The high surface roughness may significantly enhance the internal surface area to further increase the heat exchanger efficiency and the ability to create high pressure difference between the inlet and exit pipes of the disclosed heat exchanger.

Figure 7:
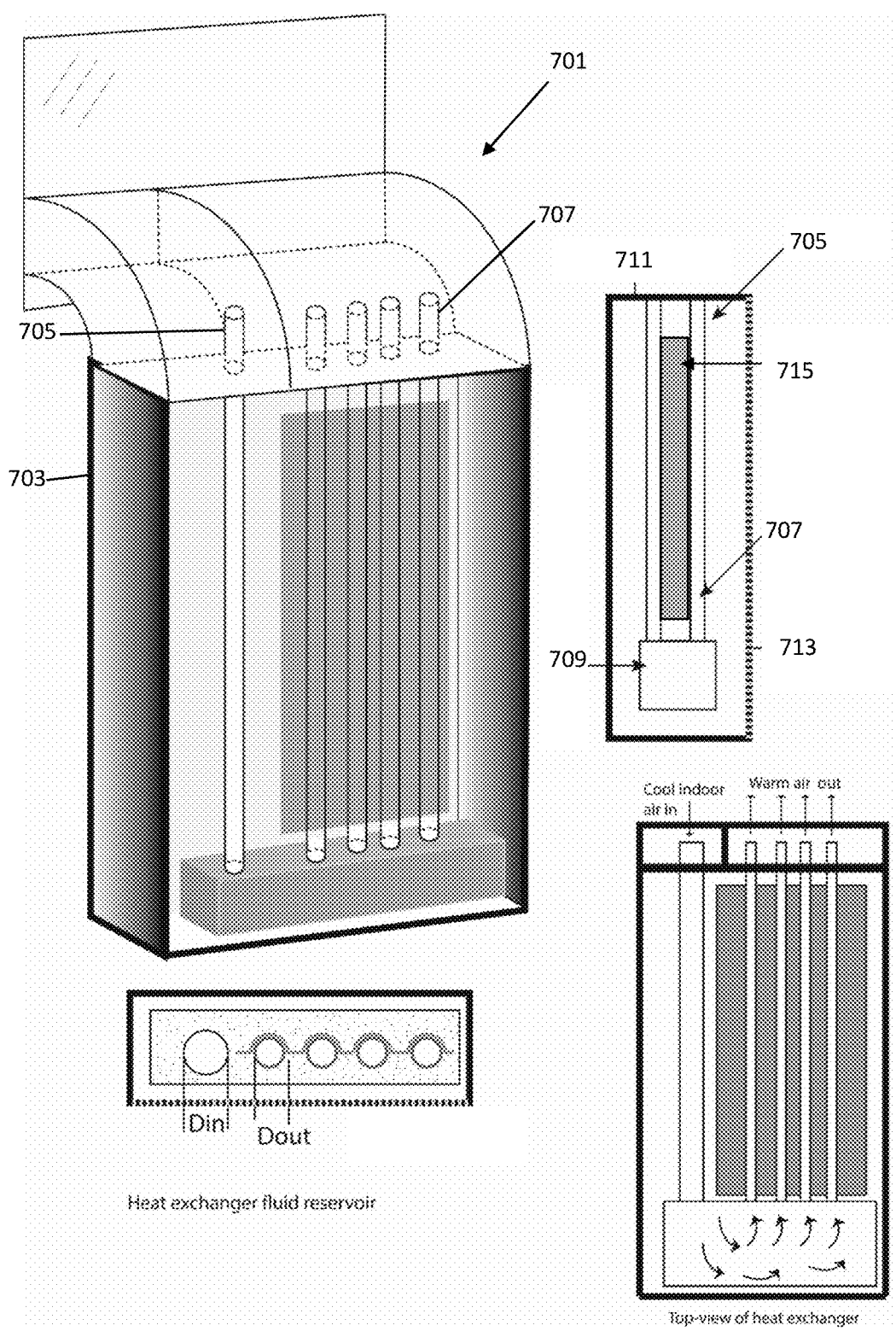
FIG. 7 is a simplified diagram of an alternative embodiment of a pumpless solar energy based air heater in accordance with the present application.
Figure 8:
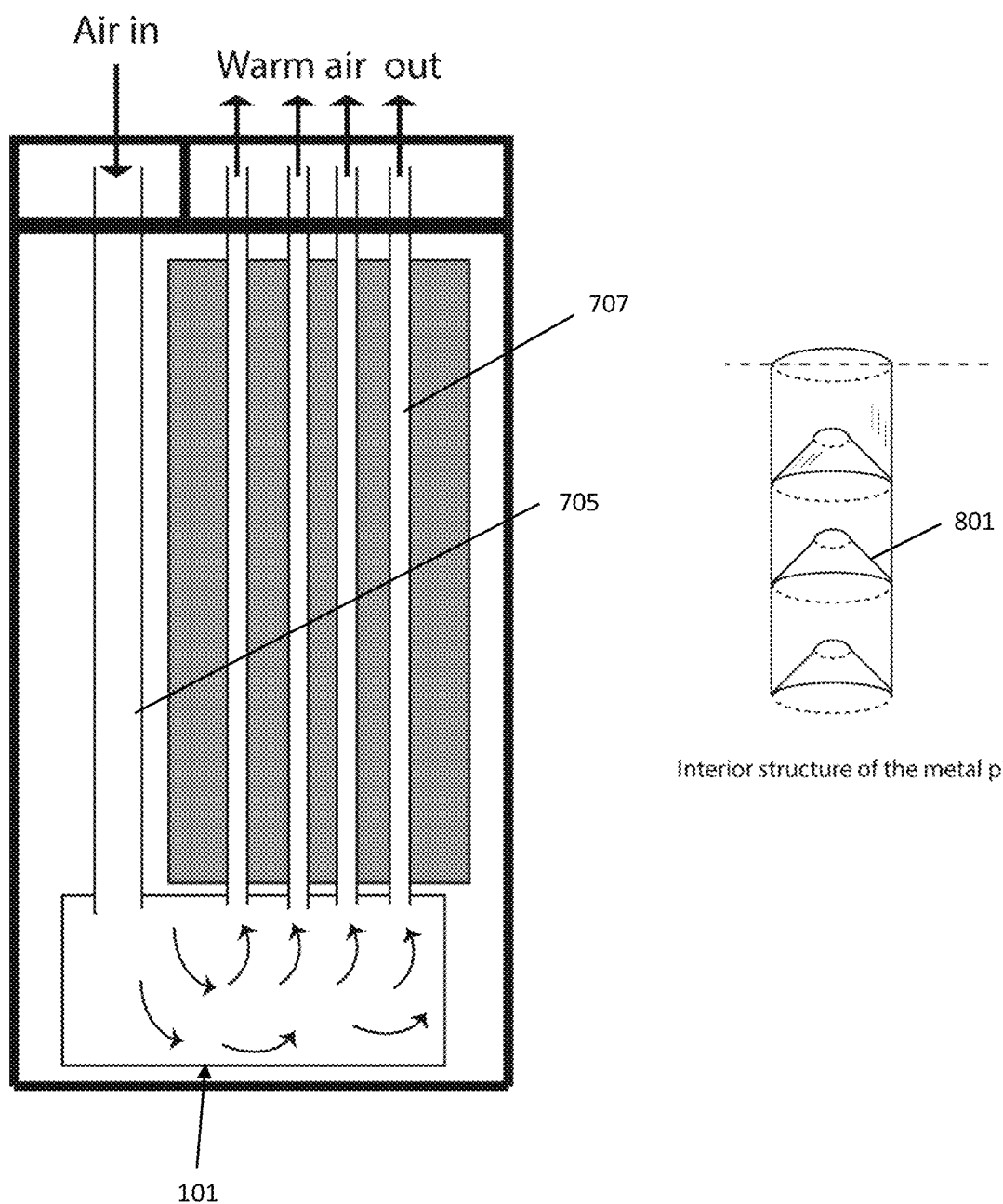
FIG. 8 is an internal view of the inlet and exit pipes of FIG. 7.

In FIGS. 7 and 8, an alternative embodiment of a pumpless solar air heater 701 is shown, wherein a housing 703 is rectangular and substantially flat. As previously discussed, this embodiment also includes one or more inlet pipes 705, and one or more outlet pipes 707 being similar in form and function to the configuration discussed above, wherein cool air is pulled into a chamber 709 and pushed back into the building via exit pipes. The housing includes insulated sides 711, a glass cover 713, and a radiation absorber 715. Heat exchanger for the flat plate solar collector may have intake pipe in the area where solar collector sheet is absent. This mechanism will allow the cool and heavy indoor air to stay inside the intake pipe. However, the exit pipes are welded to the solar collector plate in the right side region. As solar radiation hit the absorber plate heat will travel to the exit pipes. Subsequently, heat from the exit pipe surface will reach inside the pipe via heat conduction and will be gained by the air molecules in the direct contact with the internal structures of the exit pipes.

Heat exchanger fluid reservoir collects the cool incoming air via intake pipe and divert to the exit pipes. The diameter of the exit pipes may be smaller than the diameter of the inlet pipes. According to the top view the solar collector the solar radiation absorbed may be wrapped partly (in semi-circular manner) for effective heat transfer. Further, as previously discussed, the exit pipes can include internal structure 801 to create the pressure differential necessary.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A pumpless solar energy-based air heater, comprising: a body housing composed of a glass material, the body housing forming an interior area; a chamber disposed within the interior area and surrounded by a heat conducting medium, the heat conducting medium is spaced apart from the glass material and forms a vacuum gap; an intake pipe configured to draw cool air into the chamber, the intake pipe having an intake diameter and extending through the heat conducting material to the chamber; and
    an exit pipe having an exit diameter, the exit pipe is configured to push warm air out from the chamber, the exit pipe having one or more structures within the interior, the one or more structures are conical in shape and configured to create a low friction factor for the air flowing upwards in the exit pipe while creating a high friction factor for the air attempting to move downward, thereby forcing air flow in an upward direction; wherein the intake diameter is greater than the exit diameter; and wherein a pressure difference is created between an entry point of the intake pipe and an end point of the exit pipe.

2. The heater of claim 1, wherein the body further comprises: a radiation absorbing layer surrounding the heat conducting medium.

3. A method of heating a room, the method comprising: providing the heater of claim 1; securing the heater to a position wherein the intake pipe and exit pipe are in fluid communication with the room, thereby receiving air from the room and pushing air back into the room; wherein cool air enters the chamber via the intake pipe; wherein the cool air is warmed via solar energy; and wherein warm air is pushed back into the room via exit pipe.

* * * * *